United States Patent [19]

Yuen et al.

[11] 4,428,453

[45] Jan. 31, 1984

[54] EXHAUST SILENCES FOR INTERNAL COMBUSTION ENGINES

[76] Inventors: Yat C. Yuen, 70 Lee Garden Rd., Flat L, 17th Fl., Hong Kong, Hong Kong; Kin S. Yuen, 54 Ross Hall Bldg. South, Piscataway, N.J. 08854

[21] Appl. No.: 370,058

[22] Filed: Apr. 20, 1982

[30] Foreign Application Priority Data

Apr. 28, 1981 [GB] United Kingdom ................ 8113034

[51] Int. Cl.³ .................................................. F01N 1/08
[52] U.S. Cl. .................................... 181/231; 181/212; 181/277; 181/260
[58] Field of Search ............... 181/249, 250, 254, 260, 181/231, 277, 278, 212; 55/276, 283, 295, 296, DIG. 21

[56] References Cited

U.S. PATENT DOCUMENTS 1,061,775 5/1913 Newton et al. ...................... 181/260
1,153,097 9/1915 Miller .................................. 181/278

Primary Examiner—Benjamin R. Fuller
Attorney, Agent, or Firm—Fay & Sharpe

[57] ABSTRACT

A silencer comprises a chamber with internal baffles mounted on a rod so that they can be manually reciprocated to scrape deposits off the chamber wall. A head at an end of the rod protruding from the chamber is screwable to a chamber end wall to hold the rod and baffles fixed during normal operation of the silencer. Loose material is expelled through a drain plug. The inlet and outlet are provided by a single through pipe which houses a tube separated into compartments by a partition. Gases enter the upstream compartment and flow through perforations in the tube and pipe into the chamber interior, then into an inverted trough through further perforations into the downstream compartment and the outlet. The chamber may be partly filled with water or a liquid cleanser, and may have cooling means.

15 Claims, 9 Drawing Figures

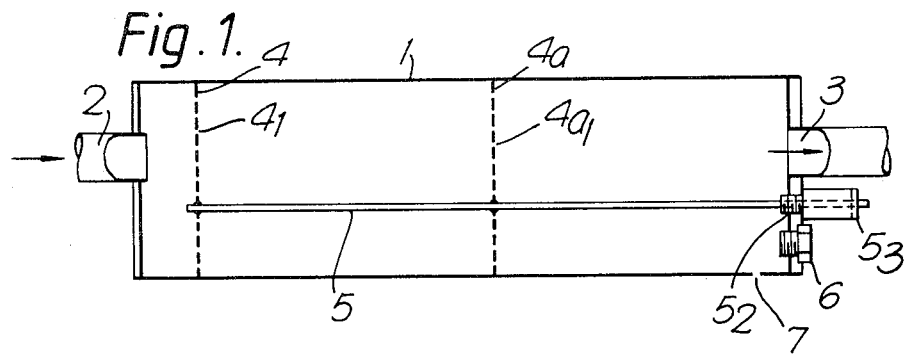
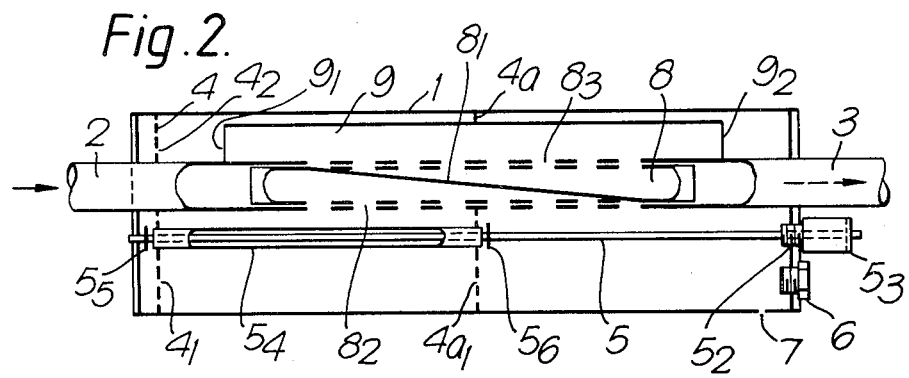
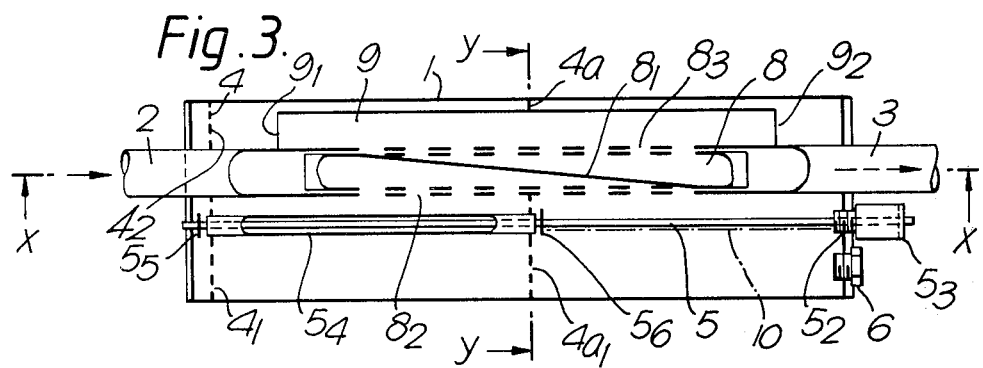
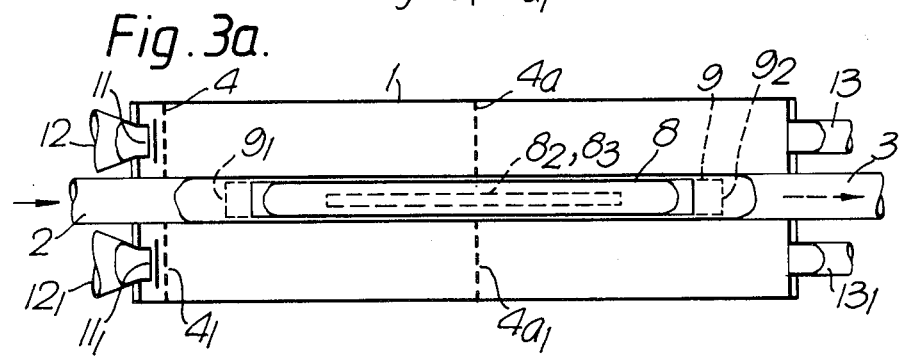

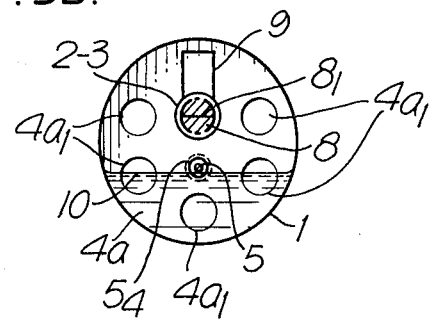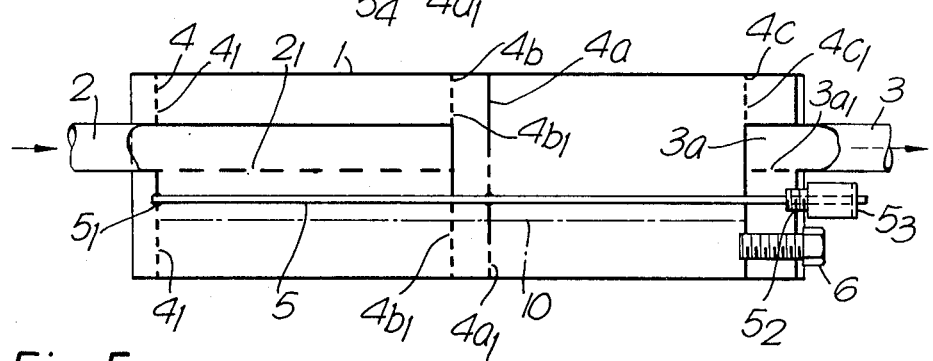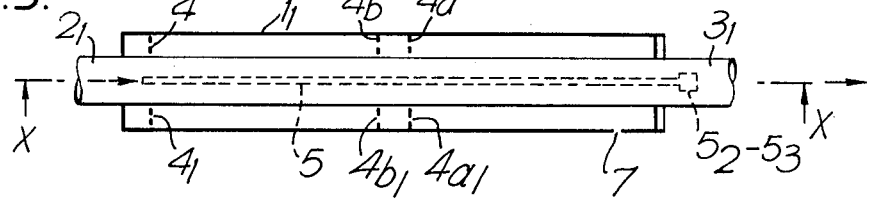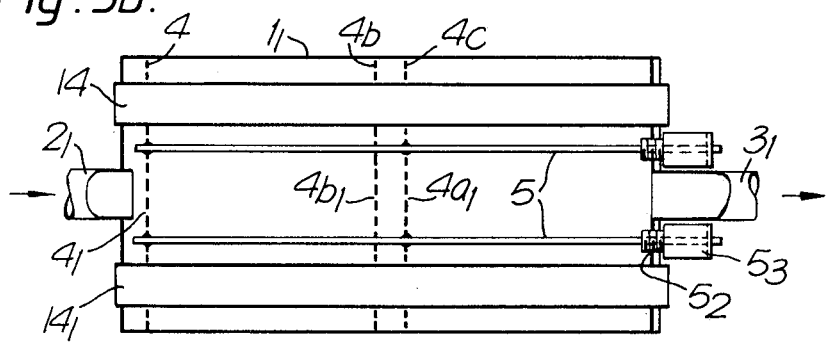

EXHAUST SILENCES FOR INTERNAL COMBUSTION ENGINES

This invention relates to silencers for the exhaust gases of internal combustion engines.

SUMMARY OF THE INVENTION

In accordance with the invention, a silencer for the exhaust of an internal combustion engine comprises a cylindrical chamber having an inlet and outlet for exhaust gases, a pair of spaced apart perforated baffle plates within the chamber, means for moving the baffle plates longitudinally of the chamber to scrape deposited material from the inside cylindrical surface of the chamber, and a plugged aperture through which the deposited material scraped from the surface may be expelled.

In an embodiment of the invention the inlet and outlet of the chamber are provided by opposite ends of a pipe passing longitudinally through the chamber, the pipe surrounding an internal tube open at each end and having an imperforate internal partition dividing the tube into two separate compartments, one of the compartments being in communication with the interior of the chamber through perforations in the tube and the surrounding pipe, and the other compartment being in communication through further perforations in the tube and the surrounding pipe with a trough mounted on the pipe within the chamber, the ends of the trough being in communication with the interior of the chamber.

The chamber may be partly filled with water or a liquid gas cleansing composition, or may be provided with a small drain hole for condensates.

Embodiments of the invention will now be described with reference to the accompanying drawings wherein:

FIG. 1 represents diagrammatically a longitudinal section view of a first embodiment of the invention, FIG. 2 represents a similar view of a second embodiment, FIG. 3 represents a similar view of a third embodiment, FIG. 3a represents a further longitudinal section taken along the line x—x in FIG. 3, FIG. 3b represents a cross-section on the line y—y in FIG. 3, FIG. 4 represents a longitudinal sectional view of a fourth embodiment of the invention, FIG. 5 shows a diagrammatic section of an auxiliary silencer on the line Y—Y in FIG. 5a, FIG. 5a shows an end view of the auxiliary silencer, and FIG. 5b shows a section on the line x—x in FIG. 5.

DESCRIPTION OF THE PREFERRED EMBODIMENT

The silencer shown in FIG. 1 comprises a cylindrical chamber 1 closed at each end and provided with inlet 2 and outlet 3 pipes for the flow of exhaust gases therethrough. Within the chamber two transverse perforated baffle plates 4,4a are mounted on a rod 5 extending parallel to the longitudinal centreline of the chamber. One end of the rod which protrudes beyond the end wall of the chamber which carries the outlet pipe is provided with a head $5_3$ which is secured to the said chamber wall by a screw-threaded portion $5_2$ in a tapped hole in the chamber wall. A small hole 7 at the bottom of the chamber forms a drain for condensate produced when the silencer is exposed in cold weather and heated up by the hot exhaust gases during engine starting. The drainage usually forms a stream of obnoxious smoke.

The head $5_3$ is rotatably mounted on the rod so that it can be unscrewed from the chamber wall, to allow the rod to be manually reciprocated thus causing both baffle plates to scrape deposits of soot or other waste material from the interior of the cylindrical wall of the chamber. After the deposits have been thus loosened, a plug 6 is unscrewed from the rear wall of the chamber to open a drain aperture through which the loosened deposits are expelled by the moving exhaust gases. After cleansing the plug 6 is replaced and the head $5_3$ remounted on the rear chamber wall.

The silencer shown in FIG. 2 similarly comprises a cylindrical chamber 1 enclosing perforate baffles 4, 4a mounted on a longitudinal rod 5 provided with a head $5_3$ and a drain plug 6. This embodiment, however, differs principally from that shown in FIG. 1 in that the separate inlet and outlet pipes are formed by a single pipe extending through the chamber parallel to its longitudinal centre line.

Within the inlet/outlet pipe line 2-3 there is mounted a tube 8 open at each end and having an internal partition $8_1$ extending substantially from one end of the tube to the other end and inclined at an angle to the axis of the tube to divide the tube 8 into two separate compartments. The wall of tube 8 is provided underneath with perforations $8_2$ which register with further perforations in the wall of the main pipe line 2-3. The tube 8 wall is provided above with perforations $8_3$ which register with further perforations in the wall of the main pipe line 2-3.

Around the part of the pipe wall having perforations communicating with one of the compartments there is mounted an inverted trough 9, the ends of which $9_1,9_2$ are open to the interior of the chamber 1. The baffle plates 4,4a are apertured as at $4_2$ to accomodate the trough 9, and are linked by a tube $5_4$ mounted on the rod 5 by locking rings $5_5,5_6$.

In use incoming gases through the inlet end 2 of the inlet/outlet pipe enter the upstream compartment of the tube 8 and pass through the perforations in the pipe and tube communicating with that compartment into the exterior of the chamber. From the chamber interior the gases enter the trough through the open ends $9_1$, $9_2$ pass through the perforations $8_5$ in the pipe and tube into the second tube compartment and are then expelled through the outlet end 3 of the pipe.

The embodiment shown in FIGS. 3, 3a and 3b is similar in construction to the embodiment shown in FIG. 2 and is partly filled with water or a liquid cleansing composition to the level 10 which lies below the inlet/outlet pipe 2, 3. By this means exhaust gases entering the chamber from the upstream compartment of the inner tube 8 are washed before entering the inverted trough 9. This embodiment of the invention also includes means for admitting cold air to the silencer to reduce the internal temperature of the silencer and thereby condense noxiuos vapours which would otherwise be expelled to atmosphere through the silencer outlet. The cooling means comprises a pair of trumpet shaped inlet pipes 12, $12_1$ fixed to the front end wall of the silencer each provided with a one way check valve 11, $11_1$ to prevent escape of the gases within the chamber through the inlet pipes 12, $12_1$. Additional outlet pipes 13, $13_1$ are also provided at the rear end wall of the chamber.

This embodiment thus incorporates four advantages as follows.

1. Deposits forming on the interior wall of the chamber can be loosened by the scraping action described with reference to FIG. 1 for subsequent ejection through the drain plug 6.

2. Any ejection of smoke when engine starting in cold weather by the drain off the condensate collected in the silencer is avoided.

3. The presence of a washing medium condensing noxious vapours as previously described reduces pollution.

4. Entry of cooling air through the inlets 12, $12_1$ prevents the temperature of the silencer rising to an extent such that condensation of the noxious vapours ceases to be effective.

The silencer shown in FIG. 4 comprises a closed cylindrical chamber 1 provided centrally at one end with an inlet pipe 2 extending to the chamber 1 and at the other end an outlet pipe 3 for the flow of exhaust gases. Within the chamber 1, two transverse baffles 4 and 4a are fixed on a rod 5 extending parallel to the longitudinal centre line of the chamber 1. The baffle 4 at the end of rod 5 is perforated with holes 4a only in the lower part of the baffle 4a. There is a plate 4b fixed at the middle of chamber 1, closing the inner end of pipe 2 and which is also perforated with holes $4_{b1}$ above and under pipe 2. The exhaust gases from pipe 2 flow through the apertures $2_1$ under pipe 2, into a quantity of liquid 10 forming a cleansing bath.

The inner end of pipe 3, protruding a distance 3a into chamber 1 is closed by a plate 4c perforated with holes $4_{c1}$ above the upper section 3a. The lower part of the pipe length 3a has holes $3_{a1}$ for the exit of the exhaust gases from the chamber.

The rod 5 is operated for scraping deposits from the chamber wall as described above, i.e. by reciprocating it over half the length of chamber 1, the plug 6 being removed.

The chief difference between the embodiment shown in FIG. 4 and that of FIG. 1, is that chamber 1 is filled with water.

FIGS. 5, 5a and 5b show an auxiliary silencer for installation upstream of any of the silencers described above to reduce the temperature and noise of the exhaust gases. The silencer comprises a chamber 1a with inlet and outlet pipes $2_1$, $3_1$ at its opposite ends. Open-ended pipes 14, $14_1$ extend through the chamber from one end to the other and form cold air ducts for reducing the internal chamber temperature. Midway between the ends of the chamber there is fixed a baffle 4b provided with perforations $4_{b1}$. Two further spaced apart baffles 4, 4c which respectively are provided with a perforations $4_1$, $4_{a1}$ are mounted on rods 5 so that they can be reciprocated as previously described for scraping deposits from the chamber wall. Baffle 4 is mounted on the inner ends of the rods adjacent to inlet end of the chamber and baffle 4c at an intermediate position so that movement of the rods over half the chamber length produces a scraping action over substantially the entire wall length. As before the deposits are removable through a plugged hole 6 and a drain hole 7 is provided for condensates.

Although the invention has been shown and described with reference to preferred embodiments, it is obvious that alterations and modifications will occur to others upon a reading and understanding of this specification. The invention includes all such alterations and modifications insofar as they come within the scope of the appended claims or the equivalents thereof.

What is claimed is:

1. A silencer for the exhaust of an internal combustion engine, comprising:
a cylindrical chamber through which the exhaust gases are directed,
at least one perforated baffle plate within the chamber and in scraping contact with the chamber inside surface,
means for moving the at least one baffle plate longitudinally of the chamber to scrape deposited material from the inside surface thereof, and
a plugged aperture communicating with the chamber which can be selectively unplugged to allow the deposited material scraped from the inside chamber surface to be expelled therethrough.

2. A silencer according to claim 1 wherein the inlet and outlet of the chamber are provided by opposite ends of a pipe passing longitudinally through the chamber, the pipe surrounding an internal tube open at each end and having an imperforate internal partition dividing the tube into two separate compartments, one of the compartments being in communication with the interior of the chamber through perforations in the tube and the surrounding pipe, and the other compartment being in communication through further perforations in the tube and the surrounding pipe with an inverted trough mounted on the pipe within the chamber, the ends of the trough being in communication with the interior of the chamber.

3. A silencer according to claim 2 wherein the tube is circular in cross-section, the partition extends from one end thereof to the other end and is inclined to the axis of the tube, and the perforations are formed in the cylindrical wall of the tube.

4. A silencer according to claim 1, 2 or 3 having an open drain aperture to release condensates from the chamber.

5. A silencer according to claim 2 or 3 wherein the chamber is partly filled with water.

6. A silencer according to claim 4 wherein end walls of the chamber are provided with ports for the entry and exit of air into and from the chamber.

7. A silencer according to claim 1 in which the at least one baffle plate is fixed to a rod which protrudes from one end of the chamber and forms the means for moving the baffle plate, a handle on the protruding end of the rod being screw-threadably detachably secured to the chamber.

8. The silencer according to claim 2 wherein the chamber is partly filled with a liquid cleansing composition.

9. The silencer according to claim 1 wherein the at least one baffle plate comprises a pair of spaced apart baffle plates.

10. A cleansable muffler for an internal combustion engine, comprising:
a chamber having an entry port and an exit port through which exhaust gases of the engine are directed, said chamber further including an inside wall surface upon which solids material in the exhaust gases is deposited;
scraper means positioned inside and in scraping contact with said chamber for scraping the inside surface of said chamber to loosen said solids material;
actuator means for selectively actuating said scraper means; and, selectively openable aperture means disposed on a wall of said chamber for enabling said solids material to be expelled from said chamber.

11. The muffler according to claim 10 wherein said scraper means includes a pair of spaced apart perforated baffle plates which are in scraping contact said chamber inside wall surface.

12. The muffler according to claim 11 wherein said actuator means includes rod means having said pair of baffle plates are affixed thereto for selectively moving said pair of baffle plates longitudinally of the chamber.

13. The muffler according to claim 10 wherein said chamber is cylindrical.

14. The muffler according to claim 13 wherein the chamber is partially filled with a liquid for washing the exhaust gases of the engine.

15. The muffler according to claim 10 further comprising:
a first port located on a wall of said chamber for allowing the drainage of condensates from said chamber;
at least one second port located on a wall of said chamber for allowing the entry of atmospheric air into said chamber; and,
at least one third port located on a wall of said chamber for allowing a secondary exit of gases from said chamber separate from said exit port.

* * * * *